United States Patent
Huang

(10) Patent No.: US 7,825,075 B2
(45) Date of Patent: *Nov. 2, 2010

(54) VISCOSITY ENHANCERS FOR VISCOELASTIC SURFACTANT STIMULATION FLUIDS

(75) Inventor: Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/481,341

(22) Filed: Jun. 9, 2009

(65) Prior Publication Data

US 2009/0312203 A1    Dec. 17, 2009

Related U.S. Application Data

(62) Division of application No. 11/608,035, filed on Dec. 7, 2006, now Pat. No. 7,544,643.

(51) Int. Cl.
C09K 8/60 (2006.01)

(52) U.S. Cl. ............... 507/271; 507/240; 507/241; 507/244; 507/245; 507/248; 507/260; 507/261; 507/265; 507/270; 507/274; 507/275; 166/305.1

(58) Field of Classification Search ............... None
See application file for complete search history.

(56) References Cited

U.S. PATENT DOCUMENTS

| | | | | |
|---|---|---|---|---|
| 4,584,327 A | * | 4/1986 | Sutton | 523/130 |
| H1685 H | * | 10/1997 | Lau et al. | 507/140 |
| 5,728,654 A | * | 3/1998 | Dobson et al. | 507/272 |
| 5,858,928 A | * | 1/1999 | Aubert et al. | 507/128 |
| 5,916,849 A | * | 6/1999 | House | 507/110 |
| 7,081,439 B2 | * | 7/2006 | Sullivan et al. | 507/269 |
| 7,207,388 B2 | * | 4/2007 | Samuel et al. | 166/294 |
| 7,265,079 B2 | * | 9/2007 | Willberg et al. | 507/269 |
| 7,343,972 B2 | * | 3/2008 | Willingham et al. | 166/279 |
| 7,347,266 B2 | * | 3/2008 | Crews et al. | 166/300 |
| 7,550,413 B2 | * | 6/2009 | Huang et al. | 507/240 |
| 2003/0234103 A1 | * | 12/2003 | Lee et al. | 166/293 |
| 2004/0106525 A1 | * | 6/2004 | Willberg et al. | 507/200 |
| 2007/0151726 A1 | * | 7/2007 | Crews et al. | 166/246 |
| 2007/0298978 A1 | * | 12/2007 | Crews et al. | 507/265 |
| 2009/0192053 A1 | * | 7/2009 | Crews et al. | 507/201 |

* cited by examiner

*Primary Examiner*—James Seidleck
*Assistant Examiner*—John J Figueroa
(74) *Attorney, Agent, or Firm*—Mossman Kumar & Tyler PC

(57) ABSTRACT

Piezoelectric crystal particles (which include pyroelectric crystal particles) enhance the viscosity of aqueous fluids that have increased viscosity due to the presence of viscoelastic surfactants (VESs). In one non-limiting theory, when the fluid containing the viscosity enhancers is heated and/or placed under pressure, the particles develop surface charges that associate, link, connect, or relate the VES micelles thereby increasing the viscosity of the fluid. The higher fluid viscosity is beneficial to crack the formation rock during a fracturing operation, reduce fluid leakoff, and carry high loading proppants to maintain the high conductivity of fractures.

6 Claims, 4 Drawing Sheets

VISCOSITY ENHANCERS FOR VISCOELASTIC SURFACTANT STIMULATION FLUIDS

CROSS-REFERENCE TO RELATED APPLICATION

This application is a divisional of U.S. patent application Ser. No. 11/608,035 filed Dec. 7, 2006, which issued as U.S. Pat. No. 7,544,643 on Jun. 9, 2009.

TECHNICAL FIELD

The present invention relates to aqueous, viscoelastic fluids used during hydrocarbon recovery operations, and more particularly relates, in one embodiment, to methods and additives for increasing the viscosity of fluids gelled with viscoelastic surfactants.

BACKGROUND

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations.

Aqueous fluids gelled with viscoelastic surfactants (VESs) are also known in the art. Certain surfactants in particular proportions and conditions will self-assemble into micelles. When the micelles are elongated or "rod-like", their entanglement increases viscosity of the fluid in which they reside. VES-gelled fluids have been widely used as gravel-packing, frac-packing and fracturing fluids because they exhibit excellent rheological properties and are less damaging to producing formations than crosslinked polymer fluids. VES fluids are non-cake-building fluids, and thus leave no potentially damaging polymer cake residue.

However, the same property that makes VES fluids less damaging tends to result in significantly higher fluid leakage into the reservoir matrix, which reduces the efficiency of the fluid especially during VES fracturing treatments. Increasing the viscosity of the VES-gelled fluids would reduce their tendency to leak into the formation. Thus, it would be desirable if methods or additives were developed to enhance or increase the viscosity of the VES-gelled fluids.

SUMMARY

There is provided, in one form, a method for treating a subterranean formation that involves providing an aqueous viscoelastic treating fluid which includes an aqueous base fluid or brine, a viscoelastic surfactant (VES) gelling agent, and a viscosity enhancer. Suitable viscosity enhancers include, but are not limited to, pyroelectric particles, piezoelectric particles, and mixtures thereof. The aqueous viscoelastic surfactant treating fluid is injected the through a wellbore and into the subterranean formation, and the subterranean formation is thus treated by the fluid.

There is further provided in another non-limiting embodiment an aqueous viscoelastic treating fluid that includes an aqueous base fluid or brine, a viscoelastic surfactant (VES) gelling agent, and a viscosity enhancer that again may include pyroelectric particles, piezoelectric particles, and mixtures thereof.

The viscosity enhancers appear to help enhance the fluid viscosity and develop a pseudo-filter cake of VES micelles by associating with them as well as ions and particles to produce a novel and unusual viscous fluid layer of pseudo-crosslinked elongated micelles on the reservoir face that limits further VES fluid leak-off. Additionally, the art may be further advanced by use of viscosity enhancers that also form a similar viscous fluid layer of pseudo-crosslinked micelles on the formation face effective in controlling rate of VES fluid loss, yet can be non-pore plugging and physically easier to produce back with the VES fluid after a VES treatment. That is, the effectiveness of the method is largely independent of the size of the viscosity enhancers.

DETAILED DESCRIPTION

Figure 1:
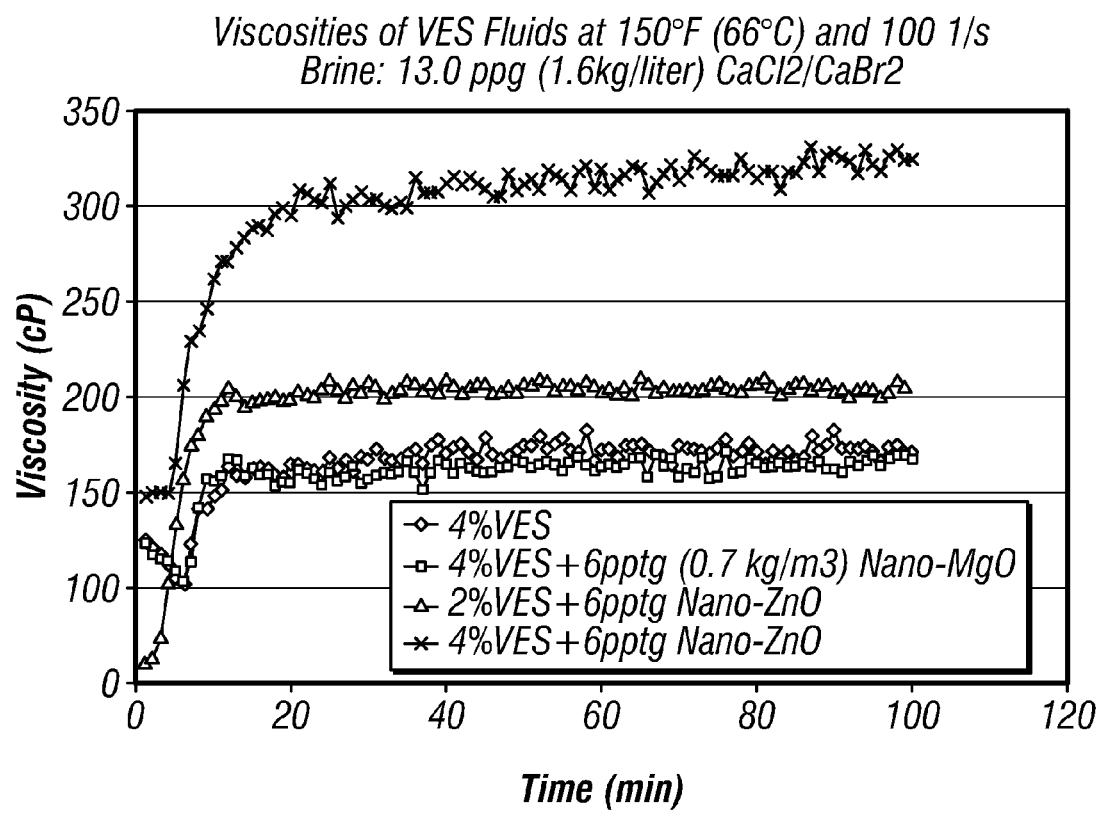
FIG. 1 is a graph of the viscosity of four viscoelastic 13.0 ppg (1.6 kg/liter) $CaCl_2/CaBr_2$ brine fluids measured at 150° F. (66° C.) and 100 1/s over time, three of which have nano-sized particles; two demonstrating that ZnO improves or enhances viscosity and one showing that MgO does not.

It has been discovered that the addition of pyroelectric crystal and/or piezoelectric crystal particles to an aqueous VES fluid demonstrate improved, enhanced or increased the viscosity of the VES fluid. The viscosity enhancers herein are believed to be particularly useful in VES-gelled fluids used for well completion or stimulation and other uses and applications where the viscosity of VES-gelled aqueous fluids may be increased. The VES-gelled fluids may further comprise proppants or gravel, if they are intended for use as fracturing fluids or gravel packing fluids, respectively, although such uses do not require that the fluids include proppants or gravel. It is especially useful that the viscosity enhancer particles are very small and thus do not readily settle out, which permits their removal from the formation to be easy and complete causing little or no damage to the formation.

In one non-limiting explanation or theory, high temperatures and/or pressures heat and/or squeeze or press the crystal particles thereby causing more electrical charges on their surfaces. The particles with surface charges associate, connect or link the VES micelles, thus further increasing their network and enhancing the viscosity of the fluid system. In particular, the VES-gelled aqueous fluids have improved (increased, enhanced or raised) viscosity over a broad range of temperatures, such as from about 70 (about 21° C.) to about 400° F. (about 204° C.); alternatively up to about 350° F. (about 177° C.), and in another non-limiting embodiment up to about 300° F. (about 149° C.). With respect to pressure, in another non-limiting embodiment, effective pressures may range from about 1000 psi (about 6.7 MPa) to about 40,000 psi (about 300 MPa). Alternatively, the lower end of the suitable pressure range may be about 100 psi (about 0.7 MPa), while the upper end may independently be about 50,000 psi (about 340 Pa). In another alternate embodiment, the lower end may be about 300 psi and the upper end may independently be about 40,000 psi (about 2.0 MPa to about 276 MPa).

This discovery allows the VES system to have improved fluid viscosity and reduced fluid loss to help minimize formation damage during well completion or stimulation operations. That is, the introduction of these viscosity enhancers to the VES-gelled aqueous system will limit and reduce the amount of VES fluid which leaks-off into the pores of a reservoir during a fracturing or frac-packing treatment, thus minimizing the formation damage that may occur by the VES fluid within the reservoir pores. Also, limiting the amount of VES fluid that leaks-off into the reservoir during a treatment will allow more fluid to remain within the fracture and thus less total fluid volume will be required for the treatment. Having less fluid leaking-off and more fluid remaining within the fracture will enable greater fracture size and geometry to be generated. Enhancing the fluid viscosity of the VES-gelled fluids also helps reduce the amount of VES necessary to achieve a particular viscosity level. Thus the use of these viscosity enhancers in a VES-gelled aqueous system will improve the performance of the VES fluid while lowering fracturing treatment cost.

Prior art VES-gelled aqueous fluids, being non-wall-building fluids (i.e. there is no polymer or similar material build-up on the formation face to form a filter cake) that do not build a true filter cake on the formation face, have viscosity controlled fluid leak-off into the reservoir. By contrast, the methods and compositions herein use a viscosity enhancer that associates with the VES micelle structures through particle surface charge attraction, allowing pseudo-crosslinking of the elongated micelles to occur, in one non-limiting explanation of the mechanisms at work herein. This unique association has been found to form a highly viscous layer of crosslinked-like VES fluid on the formation face, thus acting as a pseudo-filter cake layer that limits, inhibits and controls additional VES fluid from leaking-off into the reservoir pores (see FIGS. 3 and 4). The pseudo-filter cake is composed of VES micelles that have VES surfactants with very low molecular weights of less than 1000. This is in contrast to and different from polymeric fluids that form true polymer mass accumulation-type filter cakes by having very high molecular weight polymers (1 to 3 million molecular weight) that due to their size are not able to penetrate the reservoir pores, but bridge-off and restrict fluid flow in the pores.

The viscosity enhancers herein associate with the VES micelles and as VES fluid is leaked-off into the reservoir a viscous layer of micelles and viscosity enhancer particles and/or ions accumulate on the formation face, thus reducing the rate of VES fluid leak-off. It has been discovered that particulate plugging of the reservoir pores may not be the mechanism of leak-off control or the mechanism that allows development of the viscous micelle layer. Tests using nanometer-sized viscosity enhancer particles (on the order of $10^{-9}$ to $10^{-8}$ meters), that have no potential to bridge or plug reservoir pores of 0.1 md or higher reservoir permeability, develop the viscous micelle layer. These materials still have the same or similar leak-off control-rate profiles (i.e. rate of fluid leak-off over time) as the 1 to 5 micron size viscosity enhancer particles useful herein that are larger. Thus, the size of the viscosity enhancer is not a controlling and/or primary factor of methods and compositions herein, that is, to control, improve or enhance VES fluid viscosity.

In the method of the invention, an aqueous fracturing fluid, as a non-limiting example, is prepared by blending a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid, for a non-limiting example.

The aqueous fluids gelled by the VESs herein may optionally be brines. In one non-limiting embodiment, the brines may be prepared using salts including, but not necessarily limited to, NaCl, KCl, $CaCl_2$, $MgCl_2$, $NH_4Cl$, $CaBr_2$, $NaBr_2$, sodium formate, potassium formate, and other commonly used stimulation and completion brine salts. The concentration of the salts to prepare the brines can be from about 0.5% by weight of water up to near saturation for a given salt in fresh water, such as 10%, 20%, 30% and higher percent salt by weight of water. The brine can be a combination of one or more of the mentioned salts, such as a brine prepared using NaCl and $CaCl_2$ or NaCl, $CaCl_2$, and $CaBr_2$ as non-limiting examples.

The viscoelastic surfactants suitable for use in this invention include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

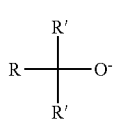

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Oil Tools as SurFRAQ™ VES. SurFRAQ is a VES liquid product that is 50% TAPAO and 50% propylene glycol. These viscoelastic surfactants are capable of gelling aqueous solutions to form a gelled base fluid. The additives of this invention may also be used in Diamond FRAQ™ which is a VES system, similar to SurFRAQ, which contains VES breakers sold by Baker Oil Tools.

The amount of VES included in the fracturing fluid depends on two factors. One involves generating, creating or producing enough viscosity to control the rate of fluid leakoff into the pores of the fracture, which is also dependent on the type and amount of fluid loss control agent used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the range for the present invention is from about 1.0 independently to about 6.0% by volume VES product. In an alternate, non-restrictive form of the invention, the amount of VES ranges from 2 independently to about 10 volume %.

The viscosity enhancers useful herein include, but are not necessarily limited to, piezoelectric crystal particles, pyroelectric crystal particles, or mixtures thereof. Generally, pyroelectric crystals are also piezoelectric. Pyroelectric crystals generate electrical charges when heated and piezoelectric crystals generate electrical charges when squeezed, compressed or pressed.

In one non-limiting embodiment, specific viscosity enhancers may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is $-9.4$ $C/m^2K$. ZnO and these and the other crystals are generally not water soluble.

In one non-limiting explanation, when the VES fluid mixed with very small pyroelectric crystals, such as nano-sized ZnO, is pumped downhole into underground formations that are under high temperature and pressure, the pyroelectric crystals are heated and/or pressed and high surface charges are generated. These surface charges permit the crystal particles to associate, link, connect or otherwise relate the VES micelles together to increase fluid viscosity. The association or relation of the micelles is thought to be roughly analogous to the crosslinking of polymer molecules by crosslinkers. The high fluid viscosity is helpful and beneficial to crack the formation rock (such as in a fracturing operation), reduce fluid leakoff and carry high loadings of proppants to maintain the high conductivity of the fractures. After the fracturing job is done, in one non-limiting embodiment, the internal breakers in the VES fluid break the VES micelles and the nano-sized ZnO particles flow back with the producing fluids. No formation damage is expected from the use of the nano-sized viscosity enhancer particles.

In another non-limiting embodiment, the viscosity enhancers herein do not include the suspension of colloidal particles employed in U.S. Pat. No. 7,081,439. More specifically, the viscosity enhancers herein do not include colloidal particles comprising a material selected from the group consisting of silica, aluminum oxide, antimony oxide, tin oxide, cerium oxide, yttrium oxide and zirconium oxide, nor mica.

In one non-restrictive embodiment, the amount of additive ranges from about 0.1 to about 500 pounds per thousand gallons (pptg) (about 0.012 to about 60 $kg/m^3$) based on the aqueous viscoelastic treating fluid. In another non-restrictive embodiment, the amount of additive may have a lower limit of about 0.5 pptg (about 0.06 $kg/m^3$) and independently an upper limit of about 100 pptg (about 12 $kg/m^3$) or 200 pptg (about 24 $kg/m^3$), and in another non-restrictive version a lower limit of about 1 pptg (about 0.12 $kg/m^3$) and independently an upper limit of about 50 pptg (about 6 $kg/m^3$), and in still another non-limiting embodiment, a lower limit of about 2 pptg (about 0.2 $kg/m^3$) and independently an upper limit of about 20 pptg (about 2.4 $kg/m^3$).

In another non-limiting embodiment, the particle size of the viscosity enhancers ranges between about 1 nanometer independently up to about 2 microns.

It turns out that the particle size distribution of the viscosity enhancer is probably not a major factor for increasing viscosity and fluid loss control in VES-gelled fluids. In one non-limiting explanation, it appears that the viscosity enhancer pyroelectric and piezoelectric crystals may generate extra positive charges on the surface of the crystal particles. These positive charges will attract the anionic part in the micelle of VES-gelled fluids and form a strong network that increases fluid viscosity and plugs the pore throats of porous formation to reduce the VES fluid loss. The surface charges of viscosity enhancer particles associating with the micelles of VES-gelled fluids form a viscous layer or a pseudo-cake on the rock surface to block fluid flowing into the rock. Another advantage for the pyroelectric and piezoelectric crystals being a good viscosity enhancer in VES-gelled fluids is that they are sufficiently small and may be easily removed during production; therefore, minimizing formation damage that can occur as compared with other known fluid loss control additives or systems.

In hydraulic fracturing applications, propping agents are typically added to the base fluid after the addition of the VES. The proppants, solid particles or gravel may be any solid particulate matter suitable for its intended purpose, for example as a screen or proppant, etc. Propping agents include, but are not limited to, for instance, quartz sand grains, glass and ceramic beads, bauxite grains, walnut shell fragments, aluminum pellets, nylon pellets, sized calcium carbonate, other sized salts, and the like. The propping agents are normally used in concentrations between about 1 to 14 pounds per gallon (120-1700 kg/m$^3$) of fracturing fluid composition, but higher or lower concentrations can be used as the fracture design requires. The base fluid can also contain other conventional additives common to the well service industry such as water wetting surfactants, non-emulsifiers and the like. In this invention, the base fluid can also contain additives which can contribute to breaking the gel (reducing the viscosity) of the VES fluid, also known as internal breakers.

While the viscoelastic fluids of the invention are described most typically herein as having use in fracturing fluids, it is expected that they will also find utility in completion fluids, gravel pack fluids, fluid loss pills, lost circulation pills, diverter fluids, foamed fluids, stimulation fluids and the like.

In another embodiment of the invention, the treatment fluid may contain other viscosifying agents, other different surfactants, clay stabilization additives, scale dissolvers, biopolymer degradation additives, and other common and/or optional components.

In a more preferable embodiment of the invention, use with internal VES breakers can have synergistic clean-up effects for the viscosity enhancers and the VES fluid. Use of the viscosity enhancers herein with an internal breaker may allow less VES fluid to leak-off into the reservoir, thus resulting in less fluid needed to be broken and removed once the treatment is over. Additionally, use of an internal breaker within the VES micelles may further enhance the breaking and removal of the pseudo-filter cake viscous VES layer that develops on the formation face with the fluid loss agents of this invention. Lab tests to date appear to show that the viscous VES pseudo-filter cake has the micelles readily broken down to the relatively non-viscous, more spherically-shaped micelles by use of an internal breaker, and also with use of an encapsulated breaker, if employed.

The invention will be further described with respect to the following Examples which are not meant to limit the invention, but rather to further illustrate the various embodiments.

EXAMPLES

Figure 2:
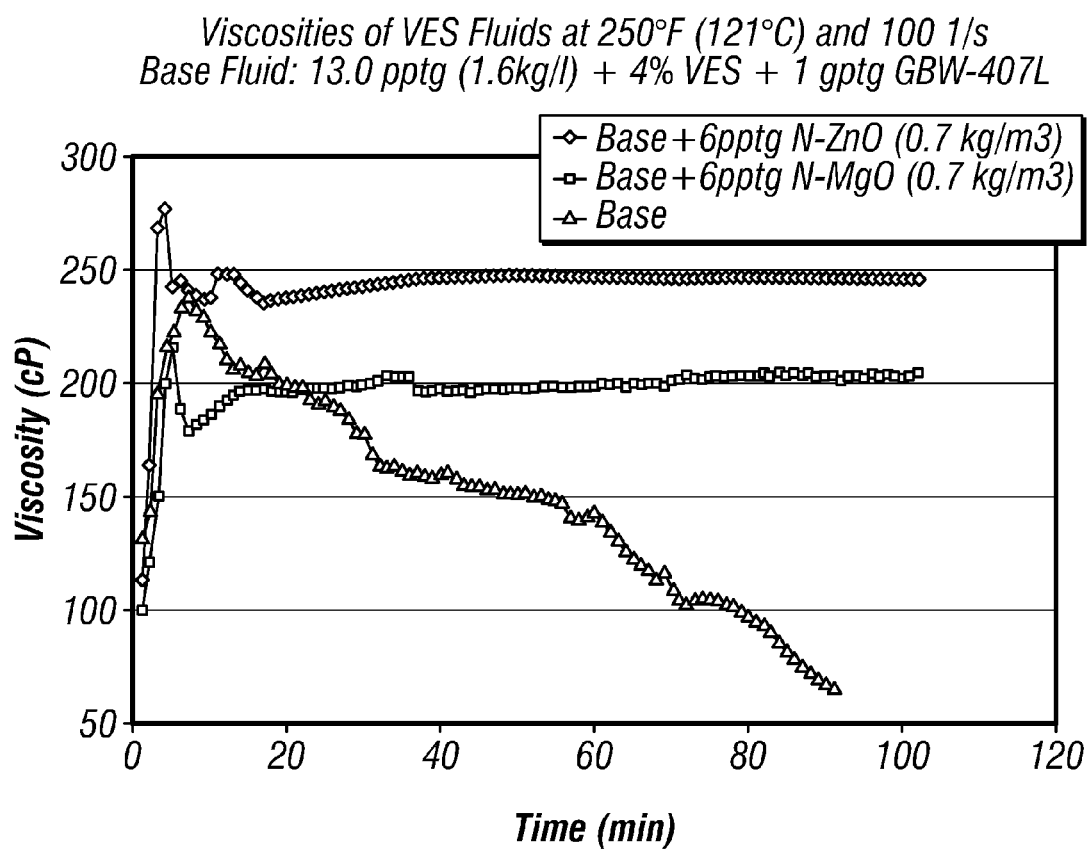
FIG. 2 is a graph of the viscosity of three viscoelastic 13.0 ppg (1.6 kg/liter) $CaCl_2/CaBr_2$ brine fluids measured at 250° F. (121° C.) and 100 1/s over time, two of which have nano-sized particles showing that both ZnO and MgO improve or enhance viscosity.

The results of laboratory tests, as presented in FIGS. 1 and 2, show that piezoelectric ZnO crystals may significantly improve the viscosity of VES-gelled aqueous fluids.

FIG. 1 is a graph of the viscosity of four viscoelastic 13.0 ppg (1.6 kg/liter) CaCl$_2$/CaBr$_2$ brine fluids measured at 150° F. (66° C.) and 100 1/s over time. Two of the fluids have nano-sized ZnO particles at 6 pounds per thousand gallons (pptg; 0.7 kg/m$^3$) at various VES loadings (2% and 4%), and both show improved or enhanced viscosity compared to the case where no additive was used. In contrast, the fluid having 6 pptg (0.7 kg/m$^3$) nano-sized MgO particles did not exhibit improved or enhanced viscosity.

FIG. 2 is a graph of the viscosity of three viscoelastic 13.0 ppg (1.6 kg/liter) CaCl$_2$/CaBr$_2$ brine fluids measured at 250° F. (121° C.) and 100 1/s over time. In this case, the fluid with 6 pptg (0.7 kg/m$^3$) nano-sized ZnO particles demonstrated improved or enhanced viscosity over the case where no additive was used. The fluid having nano-sized MgO particles at 6 pptg (0.7 kg/m$^3$) also showed viscosity improvement over the base fluid alone, but not as great an improvement as the ZnO viscosity enhancer did. These fluids contained 1 gptg GBW-407L breaker, an internal VES-gel breaker available from Baker Oil Tools. (Gptg refers to "gallons per thousand gallons". The same value may be applied using other units, e.g. liters per thousand liters.)

Figure 3:
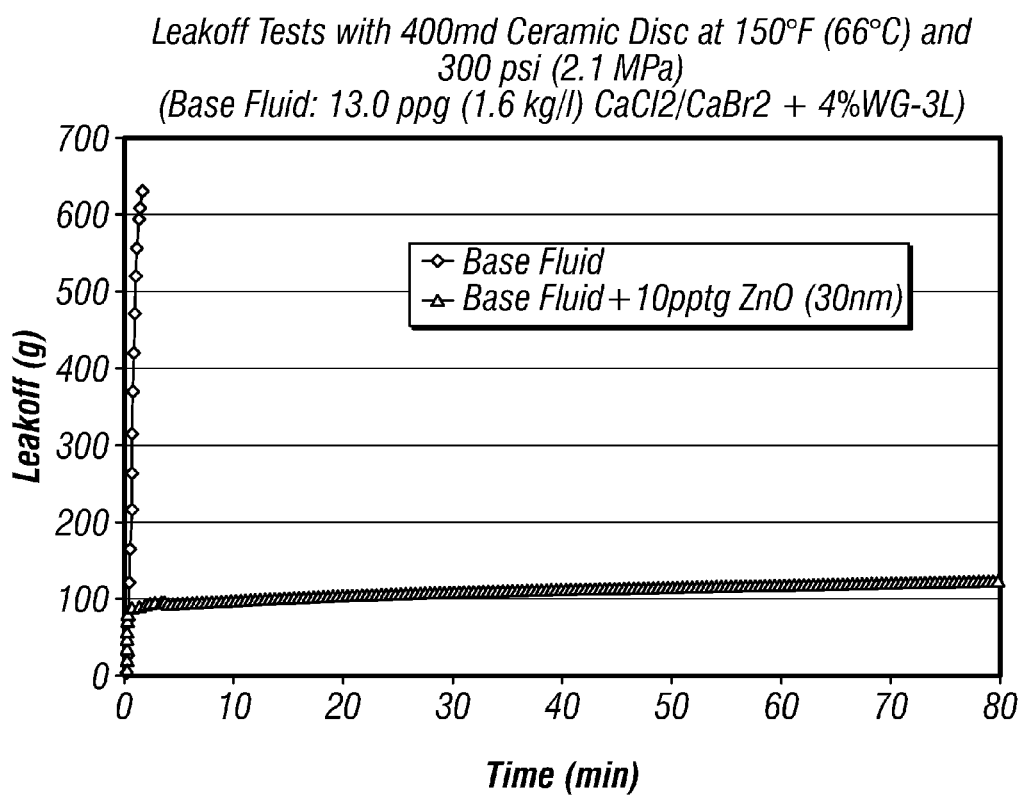
FIG. 3 is a graph of fluid leak-off test results to compare base fluids with and without viscosity enhancer such as 30 nm ZnO particles at 150° F. (66° C.) and 300 psi (2.1 MPa) on 400 md ceramic discs; the base fluid is 13.0 ppg (1.6 kg/liter) $CaCl_2/CaBr_2$ brine with 4% VES, with loading 10 pptg (1.2 kg/m$^3$) of nano-sized ZnO particles, the leak-off of the VES fluid was significantly reduced.
Figure 4:
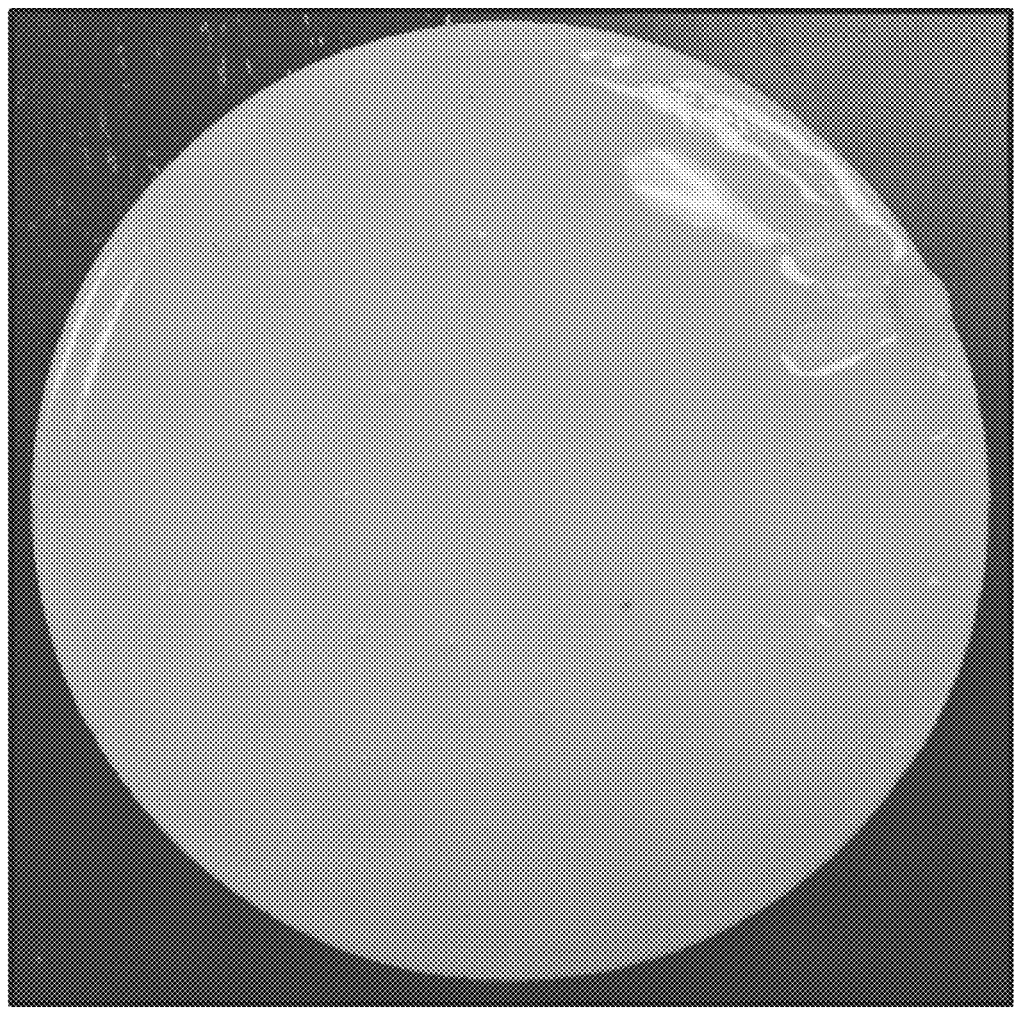
FIG. 4 is a picture of pseudo-filter cake of VES micelles with viscosity enhancer ZnO particles taken from the test in FIG. 3.

FIG. 3 is a graph of fluid leak-off test results to compare base fluids with and without viscosity enhancer such as 30 nm ZnO particles at 150° F. (66° C.) and 300 psi (2.1 MPa) on 400 md ceramic discs. The base fluid is 13.0 ppg (1.6 kg/liter) CaCl$_2$/CaBr$_2$ brine with 4% VES. With loading of 10 pptg (1.2 kg/m$^3$) of nano-sized ZnO particles, the leak-off of the VES fluid was significantly reduced. FIG. 4 is a picture of the pseudo-filter cake of VES micelles with viscosity enhancer ZnO particles. This picture is taken from the test in FIG. 3.

In the foregoing specification, the invention has been described with reference to specific embodiments thereof, and has been demonstrated as effective in improving or enhancing viscosity for VES gelled fluids. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, piezoelectric crystal particles and pyroelectric crystal particles and other components falling within the claimed parameters, but not specifically identified or tried in a particular composition, are anticipated to be within the scope of this invention.

What is claimed is:

1. An aqueous viscoelastic treating fluid comprising:
   an aqueous base fluid;
   a viscoelastic surfactant (VES) gelling agent; and
   a viscosity enhancer selected from the group consisting of berlinite (AlPO$_4$), lithium tantalate (LiTaO$_3$), gallium orthophosphate (GaPO$_4$), BaTiO$_3$, SrTiO$_3$, PbZrTiO$_3$, KNbO$_3$, LiNbO$_3$, BiFeO$_3$, sodium tungstate, Ba$_2$NaNb$_5$O$_5$, Pb$_2$KNb$_5$O$_{15}$, potassium sodium tartrate, tourmaline, topaz and mixtures thereof, where the viscosity enhancer has a particle size ranging from about 1 nanometer to about 2 microns.

2. The aqueous viscoelastic treating fluid of claim 1 where the aqueous base fluid is brine.

3. The aqueous viscoelastic treating fluid of claim 1 where the viscosity enhancer is present in an amount effective to improve viscosity of the fluid as compared with an identical fluid absent the viscosity enhancer.

4. The aqueous viscoelastic treating fluid of claim 1 where the effective amount of the viscosity enhancer ranges from about 0.1 to about 500 pptg (about 0.012 to about 60 kg/m$^3$) based on aqueous viscoelastic treating fluid.

5. An aqueous viscoelastic treating fluid comprising:
   an aqueous brine base fluid;
   a viscoelastic surfactant (VES) gelling agent; and
   a viscosity enhancer selected from the group consisting of pyroelectric particles, piezoelectric particles, and mixtures thereof, where the viscosity enhancer is present in an amount effective to improve viscosity of the fluid as compared with an identical fluid absent the viscosity enhancer, where the viscosity enhancer has a particle size ranging from about 1 nanometer to about 2 microns, where viscosity enhancer is selected from the group consisting of berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $BiFeO_3$ sodium tungstate, $Ba_2NaNb_5O_5$, $Pb_2KNb_5O_{15}$, potassium sodium tartrate, tourmaline, topaz and mixtures thereof.

6. An aqueous viscoelastic treating fluid comprising:

an aqueous brine base fluid;

a viscoelastic surfactant (VES) gelling agent; and from about 0.1 to about 500 pptg (about 0.012 to about 60 $kg/m^3$) based on the total aqueous viscoelastic treating fluid of a viscosity enhancer selected from the group consisting of berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $BiFeO_3$, sodium tungstate, $Ba_2NaNb_5O_5$, $Pb_2KNb_5O_{15}$, potassium sodium tartrate, tourmaline, topaz and mixtures thereof, where the viscosity enhancer has a particle size ranging from about 1 nanometer to about 2 microns.

* * * * *